United States Patent [19]

Guzy et al.

[11] 4,356,137

[45] Oct. 26, 1982

[54] PROCESS FOR PREPARING FRICTION CLUTCH FACING

[75] Inventors: Raymond L. Guzy, Tulsa, Okla.; Robert V. Wargin, Darien, Ill.

[73] Assignee: Borg-Warner Corporation, Chicago, Ill.

[21] Appl. No.: 214,841

[22] Filed: Dec. 10, 1980

[51] Int. Cl.³ ............................................... B32B 5/02
[52] U.S. Cl. ..................................... 264/137; 264/174
[58] Field of Search ................. 264/137, 174; 425/113

[56] References Cited

U.S. PATENT DOCUMENTS

| | | | |
|---|---|---|---|
| 3,737,261 | 6/1973 | Hardesty | 425/113 |
| 3,956,056 | 5/1976 | Boguslawski | 425/113 X |
| 3,966,864 | 6/1976 | Stenzenberger | 264/137 |
| 4,252,696 | 2/1981 | McQuarrie | 264/137 X |

Primary Examiner—Thomas P. Pavelko
Attorney, Agent, or Firm—Richard J. Schlott

[57] ABSTRACT

An improved process for preparing friction clutch facings comprising continuous fiber strand or filament wherein the continuous strand is extrusion-coated with an uncured or partially-cured friction resin composition, wound into a preform, then thermally cured under pressure.

2 Claims, No Drawings

PROCESS FOR PREPARING FRICTION CLUTCH FACING

BACKGROUND OF THE INVENTION

This invention relates to facings for friction clutches and to a method for making friction clutch facings. The clutch facings comprise continuous strands or filaments which are extrusion-coated with a curable friction resin composition, wound into a preform and thermally cured under pressure. Clutch facings prepared by this process are asbestos-free and exhibit excellent burst strength.

Because of its great thermal resistance, asbestos has long been used as the mainstay of friction elements, particularly in the automotive industry. When used with suitable friction resin compositions, highly satisfactory friction elements result. Recently, however, health hazards associated with the manufacture and use of asbestos-containing compositions and articles have become apparent. As a result there has been an increasing effort to develop asbestos-free compositions for use in the manufacture of friction elements. The use of glass fiber in such replacement compositions has been disclosed in the art, as for example, in U.S. Pat. Nos. 3,743,069, 4,130,537 and 4,137,214. In these prior art compositions, glass fiber is included either in chopped fiber form or as continuous strand. Where glass fiber in the form of continuous strand is employed, the glass fiber is normally sized and then impregnated with a friction resin composition. The strand is usually impregnated by dip-coating, that is, by first passing the strand through a dip tank containing a dilute solution or dispersion of the friction resin composition (cement). The wet, impregnated strand is then passed through a drying tower or other equipment to evaporate the solvent and produce a dried cement-impregnated strand in an uncured state. The strand is used to wind a preform which then is thermally cured under pressure by well-known techniques to produce a cured friction element.

The dip-coating process for impregnating the continuous strand generally requires the use of cements containing substantial quantities of solvent, often greater than 50 wt% of the total composition, to ensure adequate penetration of the strand as well as to provide cements having a viscosity suitable for use in coating equipment. Where the cement is a dispersion or contains dispersed solids, settling or separation of the solid components in the dip tank may become a problem. Further, the cement-impregnated strand must be dry to be suitable for use in winding, which requires the use of a drying tower or other drying equipment. To meet ever more restrictive environmental regulations, the solvents removed in the drying step will normally be recovered by means of elaborate and expensive solvent recovery equipment and then recycled. These drying and solvent recovery steps add materially to the overall production costs. A substantial reduction or elimination of solvent use in the production of clutch facings would thus be of substantial benefit.

SUMMARY OF THE INVENTION

This invention is a friction clutch facing comprising a continuous strand extrusion-coated with a friction resin composition, and a process for making a friction clutch facing wherein a continuous strand is extrusion-coated with a thermosetting friction resin composition, wound into a preform, and then thermally cured under pressure. The clutch facings exhibit excellent burst strength, and the process of their manufacture avoids the need for elaborate drying and solvent recovery steps in the coating process by eliminating or substantially reducing the use of solvents.

DETAILED DESCRIPTION OF THE INVENTION

Clutch facings made in accordance with the teachings of this invention comprise continuous strand or filament extrusion coated with a friction resin composition.

The continuous strand or filament useful in the practice of this invention may be formed of any of the known reinforcement fibers such as glass, cotton, graphite, aramide and the like as well as combinations of two or more of these fibers. Preferably the continuous strand will be formed of glass fiber and will be treated with coupling agents to enhance resin adhesion according to practices well known in the art. The strand will preferably be sized by being impregnated with a sizing such as an RFL coating latex, employing methods and compositions known in the art and shown, for example, in U.S. Pat. Nos. 3,973,071 and 3,925,286.

The friction resin composition may be any of the thermosetting, rubber-modified resin compositions commonly employed in the production of friction elements. The standard compositions commonly include a curable phenolic resin, i.e., a thermosetting resin derived from a phenol and an aldehyde, together with a rubbery modifier such as a natural rubber or a rubbery polymer of chloroprene, butadiene, isoprene or the like, or a copolymer thereof with one or more copolymerizable monomers such as an acrylate, methacrylate or other alkylacrylate, acrylonitrile, styrene, alpha methyl-styrene, ethylene, propylene, vinyl pyridine and the like.

The composition may further include other additives including vulcanizing agents, accelerators, cross-linking aids, friction modifiers and the like according to well-known practice. Fillers such as carbon black, graphite, clay and the like may also be included, as well as chopped inorganic or organic fiber such as for example wollastonite, aramide fiber, glass fiber and the like. Friction resin compositions as such are generally well known in the art.

The continuous strand is extrusion coated with the friction resin composition. Any of the methods known in the art for the extrusion coating of wire may be employed for the purposes of this invention. One example of a machine for extrusion coating wire with viscous pasty material is disclosed and described in U.S. Pat. No. 2,315,645 and employs a wire coating die. Alternatively, the continuous filament or strand may be passed through a wire coating die fed by a conventional extruder. Further variations including continuous calendaring which have been widely employed for wire coating may also be used to coat the continuous strand or filament. The friction resin composition will be applied at room temperature or at an elevated temperature below the cure temperature of the particular resin employed. Where the viscosity of the friction resin composition, even at elevated temperatures, is too high for statisfactory coating, it may be desirable to dilute the resin composition with a minor amount of solvent to lower the viscosity and improve the coating rate. The strand exiting the extrusion die will thus be coated with substantially dry friction resin composition in an uncured condition.

The extrusion coating process may also be employed to coat a plurality of strands simultaneously to form a ribbon or tape having strands spaced apart in a side by side relationship.

The coated strand or tape is then fed to a winding machine and wound into a preform. A preform is a loosely structured article composed of woven or wound reinforcing constituents impregnated with a curable resin composition in a n uncured or partially-cured state. In one method for forming a preform, one or more extrusion-coated tapes are spirally-wound in a face to face relationship to form a wound annular disc preform of the desired size and weight. A second technique for preparing a preform is to cam-wind a coated strand or a tape in an undulating pattern such as is shown for example in U.S. Pat. No. 3,600,258 to form an annular disc preform of the desired size and weight.

The preform is then subjected to heat and pressure to produce a cured friction element according to methods well known in the art.

The friction clutch facings of this invention and the method for their preparation will be better understood by consideration of the following examples which are provided by way of illustration.

EXAMPLE 1

A friction resin composition comprising 16 wt% elastomer and 26.6 wt% phenolic resin together with mineral fillers, curing aids, tackifier and graphite, was extrusion coated onto a sized glass fiber strand. The extrusion coating was accomplished by passing the fiber strand through a wire coating extrusion die fed by a Brabender extruder, using a barrel temperature of 95° F. to extrude the resin composition. The coated strand consisted 35 wt% glass fiber (average), and 65 wt% resin composition in a partially-cured state.

The coated strand was cam-wound to form a clutch facing pre-form. The preform was placed in a mold under 2000 psi pressure and heated at 350° F. for 5 min, then post-cured at 400° F. for 5 hrs. The cured clutch facings had burst strengths of 13,100 RPM ave.

EXAMPLE 2

A friction resin composition was prepared containing 20.7 wt% elastomer, and 10.8 wt% phenolic resin together with mineral fillers, curatives, friction modifiers and chopped (¼") fluffed aramid fibers (obtained as Kevlar fiber from DuPont Co.). The composition was mixed with methyl ethyl ketone to reduce the viscosity and extruded at 90° F. onto a fiber glass strand using a wire extrusion coating die fitted to a Brabender extruder. The coated strand was cam-wound into a clutch facing preform. The preform was air dried to remove solvent, then placed in a mold under 2,000 psi pressure and heated at 350° F. for 5 min to cure the preform. The facing was then post cured at 400° F. for 5 hours under 500 psi pressure. The cured clutch facings had average burst strengths of 11,300 RPM.

EXAMPLE 3

The friction resin composition of Example 1 was employed to extrusion coat four parallel fiber glass strands simultaneously by passing the strands through a wire die having a flat ribbon die at the exit port and fed by a Brabender extruder. The resulting flat tape was used in preparing a cam-wound preform which then was cured under 2000 psi pressure at 350° F. as before to give a friction clutch facing.

EXAMPLE 4

A friction resin composition comprising 15.5 wt% elastomer, 8.0 wt% phenolic resin, 19.3 wt% chopped glass fiber and 5.5 wt% aramid fiber (obtained as dry Kevlar aramid pulp from E. I. DuPont Co.), together with mineral fillers, curatives and friction modifiers, was prepared by dry powder blending. The powder blend was fed directly to a Brabender extruder and extruded at 210° F. through a ribbon die, to demonstrate the ready extrudability of the composition.

It will be apparent from the Examples that continuous strand or filament may be extrusion coated with a friction resin composition and employed in the filament winding of preforms to provide friction clutch facings having excellent burst strength characteristics. The friction resin composition may be used directly in the extrusion process (Example 1) or mixed with a solvent to modify the resin viscosity as in Example 2. The resulting extrusion-coated strand requires no further drying prior to use in winding the preform. Where solvents are employed to modify the extrusion viscosity of the resin, the resulting coated strand may be wound without drying into a pre-form. The preform may then be dried in less complex equipment wherein solvent recovery is facilitated, thus reducing solvent loss and improving the cost factors associated therewith.

The including of short fibers such as chopped aramid fiber (Example 2) or aramid pulp (Example 4) markedly improves the wear character of the resulting friction elements. The use of chopped fiber (Example 2) required the further including of a solvent to reduce the viscosity of the friction resin composition to a level suitable for extrusion coating. Where the aramid fiber was employed in the form of a pulp comprised of highly fibrillated fibers, the friction resin composition could be readily extruded without the need for the including of a solvent. Friction clutch facings can readily be prepared by this process employing aramid fiber pulp in the friction resin composition.

The instant invention will thus be seen to be a method for making friction clutch facings comprising extrusion-coating continuous fiber strand with a curable friction resin composition, winding the strand into preform, and thermally-curing the preform under pressure.

It will be understood by those skilled in the art that various modifications of the instant process are possible and may be undertaken without departing from the spirit and scope of the invention which is defined solely by the appended claims.

We claim:

1. In a process for preparing a friction clutch facing including the steps of providing at least one continuous strand impregnated with a friction resin composition, winding said continuous strand to form an annular disc preform, and thermally curing said preform under pressure, the improvement wherein said continuous strand is impregnated by the process of extrusion coating said strand with substantially solvent-free friction resin composition comprising a rubber-modified thermosetting resin and a fiber selected from the group consisting of chopped glass fiber, chopped aramid fiber, aramid fiber pulp and mixtures thereof.

2. The process of claim 1 wherein said continuous strand is formed of fiber selected from the group consisting of glass fiber, aramid fiber and mixtures thereof.

* * * * *